United States Patent [19]

Bezos et al.

[11] Patent Number: 4,654,629

[45] Date of Patent: Mar. 31, 1987

[54] VEHICLE MARKER LIGHT

[75] Inventors: Angel P. Bezos, Montgomery County, Md.; Emilio A. Fernandez, Fairfax County, Va.

[73] Assignee: Pulse Electronics, Inc., Rockville, Md.

[21] Appl. No.: 751,221

[22] Filed: Jul. 2, 1985

[51] Int. Cl.$^4$ .............................................. B60Q 1/00
[52] U.S. Cl. ....................................... 340/87; 340/82; 340/84; 340/103; 340/114 R; 340/641; 340/331; 340/50; 340/762; 340/782; 340/815.03; 362/800; 357/76; 307/10 LS; 315/200 A
[58] Field of Search ............... 340/115, 106, 107, 103, 340/104, 114, 108, 109, 84, 81 R, 81 F, 82, 87, 635, 641, 762, 753, 754, 782, 815.31, 815.03, 815.33, 907, 908, 929, 48–50, 331, 332; 362/800, 237, 259; 307/311, 10 LS; 357/17, 32, 74, 76; 315/200 A

[56] References Cited

U.S. PATENT DOCUMENTS

| | | | |
|---|---|---|---|
| 1,284,016 | 11/1918 | Wise | 340/107 |
| 1,686,525 | 10/1928 | House | 340/103 |
| 1,738,016 | 12/1929 | Pehrson | |
| 2,290,100 | 7/1942 | Goris | 340/815.33 |
| 3,027,491 | 3/1962 | Seidler | 315/159 |
| 3,375,435 | 3/1968 | Baugher | 323/4 |
| 3,514,752 | 5/1970 | Lurkin | 340/84 |
| 3,755,697 | 8/1973 | Miller | 307/311 |
| 3,784,844 | 1/1974 | McGrogan, Jr. | 307/311 |
| 3,787,752 | 1/1974 | Delay | 307/311 |
| 3,858,063 | 12/1974 | Saleme | 307/311 |
| 3,872,463 | 3/1975 | Lapeyre | 340/762 |
| 3,878,406 | 4/1975 | Beneking | 307/311 |
| 3,887,836 | 6/1975 | Leete | 307/311 |
| 3,925,690 | 12/1975 | Spence | 340/762 |
| 3,944,854 | 3/1976 | Keller | 307/311 |
| 3,968,399 | 7/1976 | Jarrett | 307/311 |
| 3,984,810 | 10/1976 | Hudson, Jr. | 340/82 |
| 4,009,394 | 2/1977 | Mierzwinski | 350/190 |
| 4,045,683 | 8/1977 | Erickson | 307/157 |
| 4,139,261 | 2/1979 | Hilsum | 40/544 |
| 4,185,891 | 1/1980 | Kaestner | 362/800 |
| 4,190,836 | 2/1980 | Kimura et al. | 340/762 |
| 4,247,852 | 1/1981 | Utzinger | 340/641 |
| 4,271,408 | 6/1981 | Teshima et al. | 340/702 |
| 4,277,819 | 7/1981 | Sobota et al. | 362/800 |
| 4,298,869 | 11/1981 | Okuno | 340/782 |
| 4,329,625 | 5/1982 | Nishizawa et al. | 315/158 |
| 4,358,714 | 11/1982 | Sechler et al. | 307/10 LS |
| 4,365,244 | 12/1982 | Gillessen et al. | 340/782 |
| 4,403,157 | 9/1983 | Guaiardo et al. | 307/311 |
| 4,414,558 | 11/1983 | Nishizawa et al. | 357/17 |
| 4,417,240 | 11/1983 | Ahmed | 340/782 |
| 4,420,711 | 12/1983 | Takahashi et al. | 340/782 |
| 4,442,397 | 4/1984 | Ishikawa et al. | 323/275 |
| 4,556,862 | 12/1985 | Meinershagen | 340/82 |
| 4,570,207 | 2/1986 | Takahashi et al. | 362/800 |
| 4,574,269 | 3/1986 | Miller | 340/107 |
| 4,591,954 | 5/1986 | Kawamura et al. | 340/84 |

FOREIGN PATENT DOCUMENTS 891312 3/1944 France .
2139340 11/1984 United Kingdom ............... 362/800

Primary Examiner—Donnie L. Crosland
Attorney, Agent, or Firm—C. Lamont Whitham; W. Boswell Childs

[57] ABSTRACT

A marker light using an array (2) of light emitting diodes (12) in combination with lenses (3) provides a light beam of required intensity, shape and color for railroad applications. The light emitting diodes are arranged in various configurations to form the array (2). The lenses may be Fresnel lenses. Control circuitry (C) energizes the light emitting diodes at predetermined or variable flashing rates. Sensing circuitry (222) senses the failure of light emitting diodes in the array and provides an indication of such failure.

16 Claims, 15 Drawing Figures

VEHICLE MARKER LIGHT

DESCRIPTION

1. Field of the Invention

The present invention is related to marker lights employed on vehicles and, more particularly, to marker lights for the trailing end of the rear car of a passenger, commuter or freight train.

2. Description of the Prior Art

Marker lights are an important factor in the safe operation of trains and must meet specific performance requirements. They are required by Federal regulation to be displayed at night and during all other hours when weather conditions restrict visibility to the extent that railroad equipment cannot be seen at a safe distance. Marker lights must be distinctive, i.e., easily recognized, and must be well defined in terms of light intensity, distribution and color. In addition, marker lights must be easy to maintain or replaced as they are required to be inspected and checked for performance periodically.

Marker lights are battery operated and, particularly in the case of trains operating without cabooses, are usually incorporated in or packaged with other end of train equipment. In any event, they must be capable of being securely mounted, but also easily repaired or replaced. The package including other end of train equipment is frequently mounted on a railroad car coupler and is designed so that the marker light is a specified height above the top of the track. Again, Federal regulations specify that the centroid of the marker must be a minimum of 48 inches above the top of the rail.

Trains are presently required to be equipped with marker lights which provide a horizontal beam having a minimum arc width of fifteen (15) degrees each side of the vertical center line and a vertical beam with a minimum arc width of five (5) degrees each side of the horizontal center line defined in terms of 50 candela intensity points. At the center, i.e., axis, of the beam, the intensity must be not less than 100 candela nor more than 1000 candela for steady beam lights. Alternatively, flashing lights must have an effective intensity of not less than 100 candela nor more than 1000 candela where effective intensity, as defined by the "Illuminating Engineering Society's Guide for Calculating the Effective Intensity of Flashing Signal Lights, November 1964". The marker light must have a color defined by Title 49, Code of Federal Regulations, Section 221, in the red-orange-amber color range. Measurement procedures to determine beam candle power in candela are prescribed which must be strictly adhered to and proof that the requirements are met must be provided before the lights can be approved for use by railroads.

Railroad signal lights have been in use for many years. An example of an early device used for the purpose is found in U.S. Pat. No. 1,738,016 to Pehrson. Several signal light arrangements are shown in French Pat. No. 891,312. Marker lights approved and currently in use generally comprise a housing (luminaire) including a lampholder or socket, reflector and lens, and a lamp. An incandescent lamp such as a sealed beam lamp or a prefocussed lamp mounted in an optical system may be used. Gas discharge, battery operated strobe lights are frequently employed as railroad marker lights.

For additional details, reference is made to Section 221, entitled "Rear End Marking Device—Passenger, Commuter and Freight Trains," of Title 49, Code of Federal Regulations, as well as to a publication of the Department of Transportation entitled "Final Report, Guidelines for Testing of FRA Rear End Marking Devices."

Light emitting diodes (LEDs) have been suggested for use in signal lights, both on vehicles and in traffic control lights. For example, U.S. Pat. Nos. 4,277,819; 4,298,869 and 4,329,625 disclose the use of LEDs in vehicle lights specifically for identification and use as stop light, brake lights and the like. U.S. Pat. No. 4,271,408 describes a light emitting display employing LEDs disposed on concave mirror surfaces, to provide patterns, such as may be used in a traffic signal device. LEDs in combination with lenses are shown in U.S. Pat. Nos. 4,009,394 and 4,185,891. In addition, several of the above mentioned patents also describe circuits for the LEDs. Such circuits are also shown in U.S. Pat. Nos. 4,045,683; 4,190,836 and 4,420,711. Other patents which may be of interest for their showing of control circuits include U.S. Pat. Nos. 3,375,435; 3,784,844; 3,787,752; 3,858,063; 3,878,406; and 4,417,240.

SUMMARY OF THE INVENTION

It is an object of the present invention to provide an improved marker light for use with vehicles, and particularly for use on the rear end of the last car of a train.

It is a further object of the present invention to provide a marker light of simple and inexpensive construction which meets operating performance requirements but is more efficient, longer lived and more easily maintained than lights presently in use.

Another object of the invention is to provide a control circuit for use with arrays of LEDs which results in improved efficiency and reliability of the marker light.

A still further object of the invention is to provide a marker light having an emergency flash mode of operation so that, in the event the train is stopped or an emergency exists such as a brake failure, an appropriate warning can be given.

In accordance with this invention, a marker light is provided comprising a light source and a lens arrangement in combination with an enclosure or housing of suitable shape and dimensions. The light source comprises arrays of light emitting diodes (LEDs) appropriately mounted on one or more printed circuit boards and positioned with respect to lenses of the right characteristics to provide a light of the required color, intensity and pattern.

None of the patents mentioned above discloses the use of LEDs to generate a definite pattern of specified intensity and color as is required in a railroad marker. The LEDs provide a light source that is flexible when used in combination with lenses for defining the beam pattern and more efficient with respect to power requirements than light sources currently used. For example, groups of LEDs can be mounted on separate printed circuit boards and the latter placed at angles with respect to each other. The separate groups of LEDs are then used in arrays in combination with suitable lenses, e.g. cylindrical lenses in the case of preferred embodiments of the invention, to define a specific light beam pattern.

Alternatively, the LEDs can be mounted on a single printed circuit board in a variety of orientations or arrays to define the desired pattern, specifically, rows of LEDs on a single circuit board in a variety of configurations with respect to each other. Thus, a light source can comprise LED rows arranged perpendicular to each other in the same plane; i.e., on a single circuit board. In addition, the LEDs of a single row can be either perpendicular to the plane of the printed circuit board or tilted at an angle to that plane. When used in combination with an appropriate lens arrangement, a great variety of images can be obtained. Thus, a light pattern of a desired shape, color and intensity can be readily defined.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF PREFERRED EMBODIMENTS OF THE INVENTION

Figure 1:
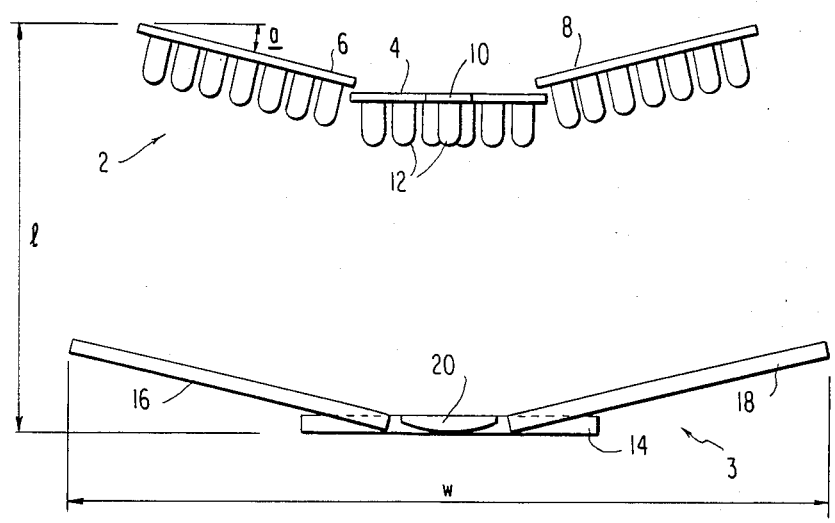
FIG. 1 is a top plan view showing diagrammatically an arrangement of LEDs and lenses according to one embodiment of the present invention.
Figure 2:
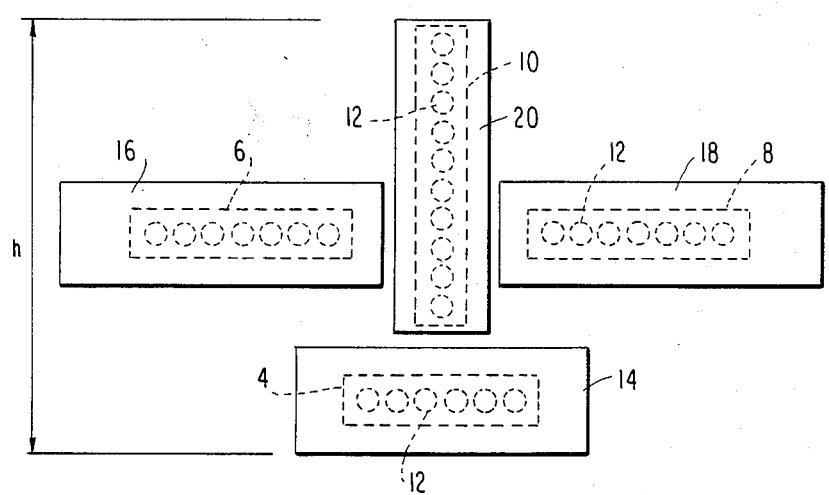
FIG. 2 is a front elevational view of the embodiment shown in FIG. 1.

Referring now to the drawings, and more particularly to FIGS. 1 and 2, there is shown diagrammatically a light source generally consisting of an array 2 of printed circuit boards 4, 6, 8, and 10 on each of which is mounted a row or line of light emitting diodes (LEDs) 12. Positioned in front of array 2 of printed circuit (PC) boards and the rows of LEDs mounted thereon is an array of cylidrical lenses 14, 16, 18, and 20 corresponding to PC boards 4, 6, 8, and 10, respectively. The relationship of the lenses 14, 16, 18, and 20 to rows of diodes 12 carried on the respective PC boards is described in detail below. The assembly of the light source or array 2 and the lens array 3 is shown as being within a dimensional outline 1, w and h representing length, width and height, respectively. The dimensional outline is resorted to in order to provide an idea of the relative dimensions of a single configuration as well as of different configurations.

The LEDs 12 have a long service lifetime and are highly efficient emmitters of light of useful wavelength which distinguishes them from other lamps, particularly incandescent lamps. In this case, the useful light must be in the red-orangeamber color range specified by 49 C.F.R. 221, as explained above. However, in the practice of this invention, it is preferred to select LEDs which provide an output as far into the red end of the spectra as possible but still within the limits set by Federal regulation since red marker lights are more universally recognized as a warning light. Suitable LEDs are available commercially.

Three of the printed circuit boards and their rows of LEDs, seen in dotted lines in FIG. 2, are horizontally extending lengthwise when viewed from the plane of the paper, i.e., in elevation, including lowermost PC board 4 and outermost PC boards 6 and 8, while PC board 10 is vertically extending as, of course, is the row of LEDs carried by it. The vertical centerline of vertical PC board 10 bisects the dimension w of the array. Furthermore, the horizontal centerlines of the boards 6 and 8 and its rows of LEDs bisect the dimension h of the array. The horizontal centerline of the lowermost PC board 4 and its row of LEDs is parallel to the plane formed by centerlines of PC boards 6 and 8, although displaced vertically from the that plane. Also PC boards 4 and 10 lie in the same vertical plane, and the vertically extending centerline of the row of LEDs carried by board 10 bisects the horizontally extending centerline of the row of LEDs carried by PC board 4. However, PC boards 6 and 8 are each inclined at an angle a to the vertical plane of boards 4 and 10.

As stated above, also shown within the dimensional outline 1, w and h in spaced relationship to and for use with the printed circuit board is an array 3 of plano convex cylindrical lenses. These are precision lenses and are available commercially with the desired specifications of focal length F, f-number, dimensions and other essential parameters. Actually, in this embodiment of the invention, each of the lenses of the array has the same specifications as well as dimensions, thereby simplifying design and construction. The combination of the rows of LEDs 12 on the respective PC boards 4, 6, 8, and 10 with its associated one of the lenses 14, 16, 18, and 20, respectively, provides the required image; i.e., light pattern meeting the requirements for a train marker light. Lens 14 is horizontally extending and is positioned in front of the row of LEDs carried on PC board 4 at a distance F from the centerline of the radiating junctions of the LEDs, the distance F being the focal length of lens 14. The longitudinal axis of lens 14 is in the same horizontal plane as the centerline of the radiating junctions of the row of LEDs 12 on PC board 4. Horizontal lenses 16 and 18 are similarly positioned in front of the rows of LEDs on PC boards 6 and 8, respectively, while vertical lens 20 is likewise positioned in front of the vertically extending row of LEDs 12 carried on PC board 10.

Figure 3:
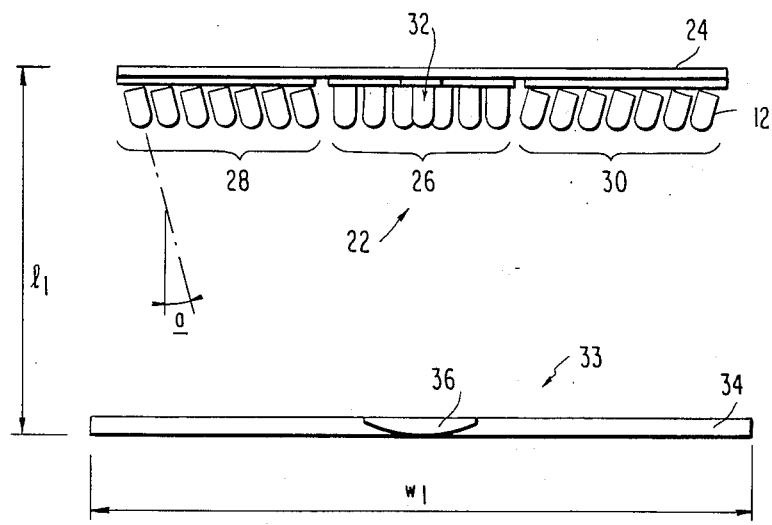
FIG. 3 is a top plan view similar to FIG. 1 of a second embodiment of the invention.
Figure 4:
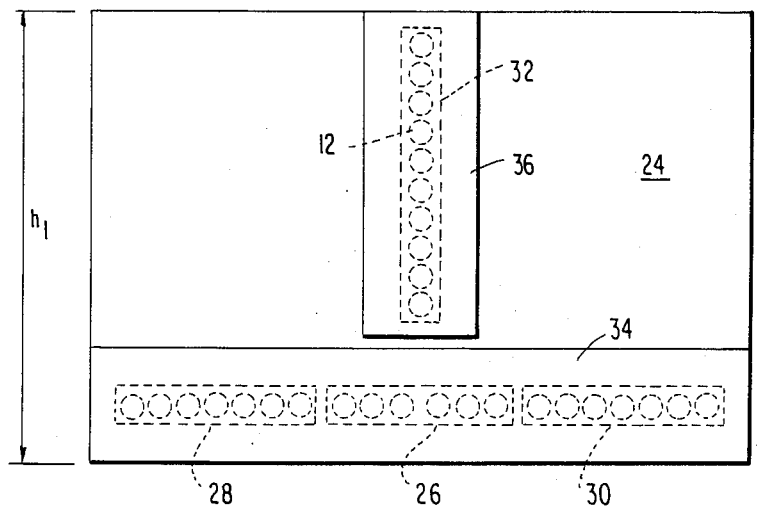
FIG. 4 is a front elevational view of the embodiment of FIG. 3.

In FIGS. 3 and 4 there is shown a somewhat more compact assembly of the PC boards with LEDs and their associated lenses. That is, the outline dimensions $l_1$ and $w_1$ of the assembly in FIGS. 3 and 4 are smaller than the same dimensions of the assembly of FIGS. 1 and 2 while the dimensions h and $h_1$ are equal. This is made possible by mounting the LEDs 12 on a single PC board 24 in an array 22 consisting of one horizontal line and one vertical line and tilting the LEDs in the outboard rows at an angle a to the horizontal centerline of these rows, and toward the center of the array as shown in FIG. 3. Four distinct rows of LEDs 12 are required by this array, each row being shown inside a dotted outline in FIG. 4. A central row 26 mounted flush with PC board 24, and two outboard rows 28 and 30 (each bracketed in FIG. 3) are arrayed in a horizontal line near the bottom of the circuit board 24 with the LEDs of outboard rows 28 and 30 tilted toward the center. Flush mounted vertical row 32 extends along the vertical centerline of the row 26, in the plane of the PC board 24, which is shown in FIG. 4 to be coextensive with the outside dimensions of the assembly.

Another advantage of the assembly of FIGS. 3 and 4, in addition to its compactness, is the fact that it requires an array of only two cylindrical lenses. Cylindrical lens 34 is coestensive with the horizontal line of LEDs 12 comrpising rows 26, 28 and 30, while cylindrical lens 36 is coextensive with the vertical line of LEDs 12 comprising row 32. As was explained above, the respective lenses 34 and 36 are positioned in front of the horizontal rows 26, 28 and 30, and vertical row 32 of LEDs 12 at a distance F, representing the focal length, from the radiating junctions of the LEDs. The longitudinal axes of the respective lenses will be in the same plane as the respective centerlines of the radiating junctions of rows 26, 28 and 30 and of row 32 of LEDs 12.

Figure 5:
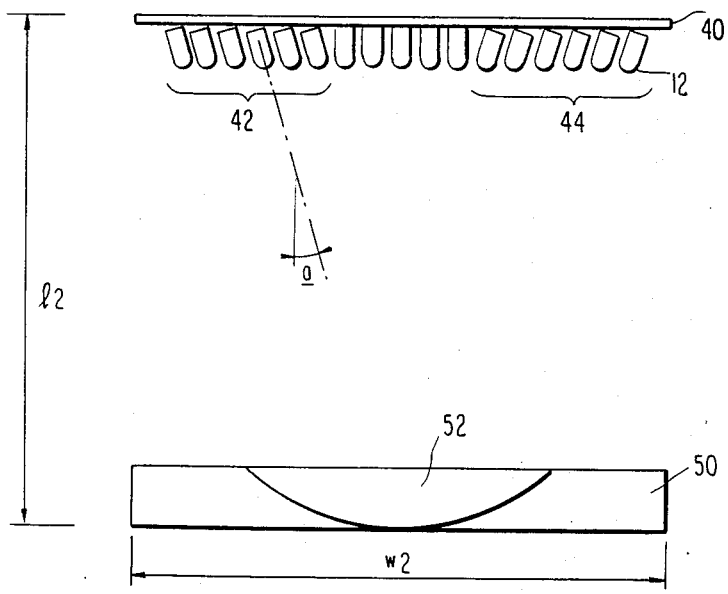
FIG. 5 is a top plan view similar to FIGS. 1 and 3 of a third embodiment of the invention.
Figure 6:
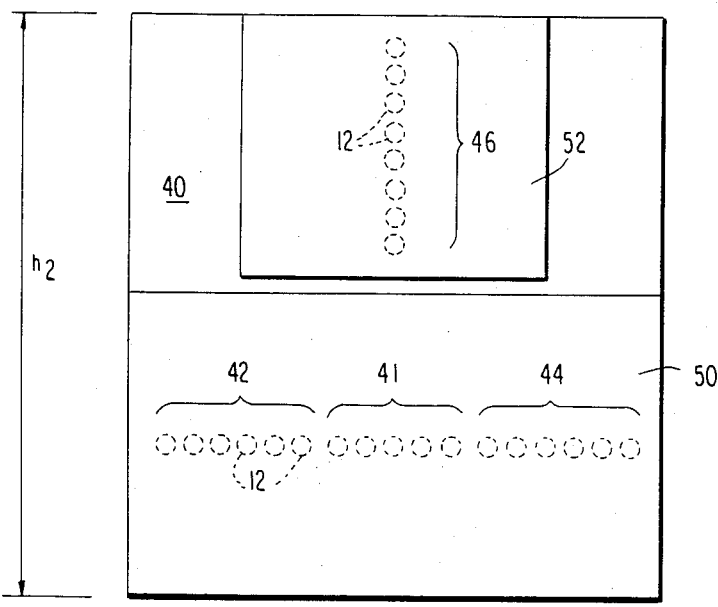
FIG. 6 is a front elevational view of the embodiment of FIG. 5.

The usefulness and flexibility of the present invention is further demonstrated in the embodiment of FIGS. 5 and 6 which shows an assembly of yet another dimensional outline as defined by $l_2$ (length), $w_2$ (width) and $h_2$ (height). This embodiment of the invention employs cylindrical lenses having a wider aperture thus permitting more illumination from the source to pass through the lenses, which in turn reduces the number of LEDs needed to produce the required light pattern. This use of wider aperture lenses results in an assembly which is smaller in width but larger in length and height than the preceding embodiments, the reduction in width being made possible by the use of fewer LEDs and the increase in length and height being necessary because of the use of larger lenses.

Except for the use of larger horizontal and vertical lenses 50 and 52, respectively, and fewer LEDs 12, this assembly generally resembles that of FIGS. 3 and 4. Thus, the LEDs 12 are arrayed in horizontal and vertical lines on a single PC board 40, the horzontal line comprising three rows of LEDs, a central row 41 having its LEDs 12 mounted flush with the surface of the PC board 40 and outboard rows 42 and 44 having their LEDs tilted at an angle a toward the center of the board. The vertical line of LEDs comprises a single row 46 of flush mounted LEDs. As before, the respective cylindrical lenses 50 and 52 are positioned a distance F and in a plane parallel to the centerlines of rows 41, 42 and 44 and row 46 of LEDs.

The PC boards on which the LEDs 12 are mounted are relatively easy to fabricate in accordance with well known techniques. To assure that alignment of the LEDs, particularly those which are tilted from a perpendicular to the plane of the PC board, is correct, a jig may be used during the soldering process.

Figure 7:
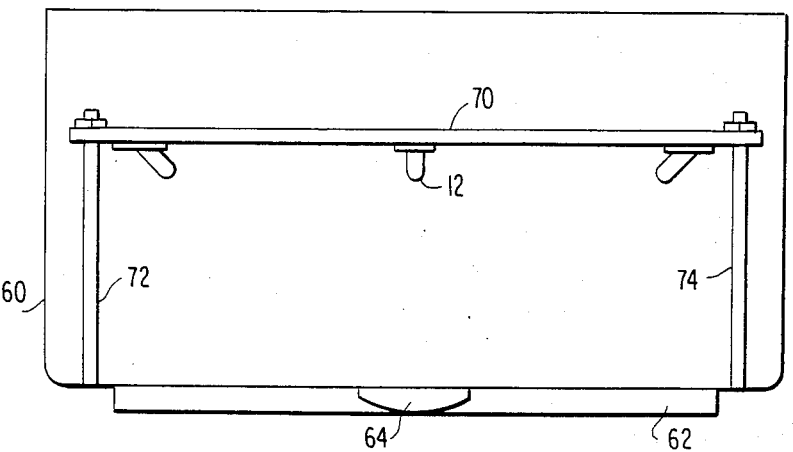
FIG. 7 is top plan view of an instrument useful in determining the relative positions of the LED light source and the lenses of the invention.

Referring now to FIG. 7, there is shown a device useful in testing and fabricating the assemblies described above. In FIG. 7, 60 represents a box-like housing of appropriate size for the desired assembly. A cylindrical lens 62 is mounted in a suitable horizontally extending opening in the front of the housing, and a second cylindrical lens 64 is similarly mounted in a vertically extending opening perpendicular to the lens 62. A PC board 70 carrying LEDs as arrayed in FIGS. 3 to 6 is mounted by adjustable means such as adjustable rods 72 and 74 in spaced relationship to lenses 62 and 64 with the rows of LEDs 12 aligned with respect to the lenses in the manner described in detail above. With energization of the LEDs, a pattern of light for a particular array can be displayed and observed as well as measured to determine its characteristics.

Figure 8:
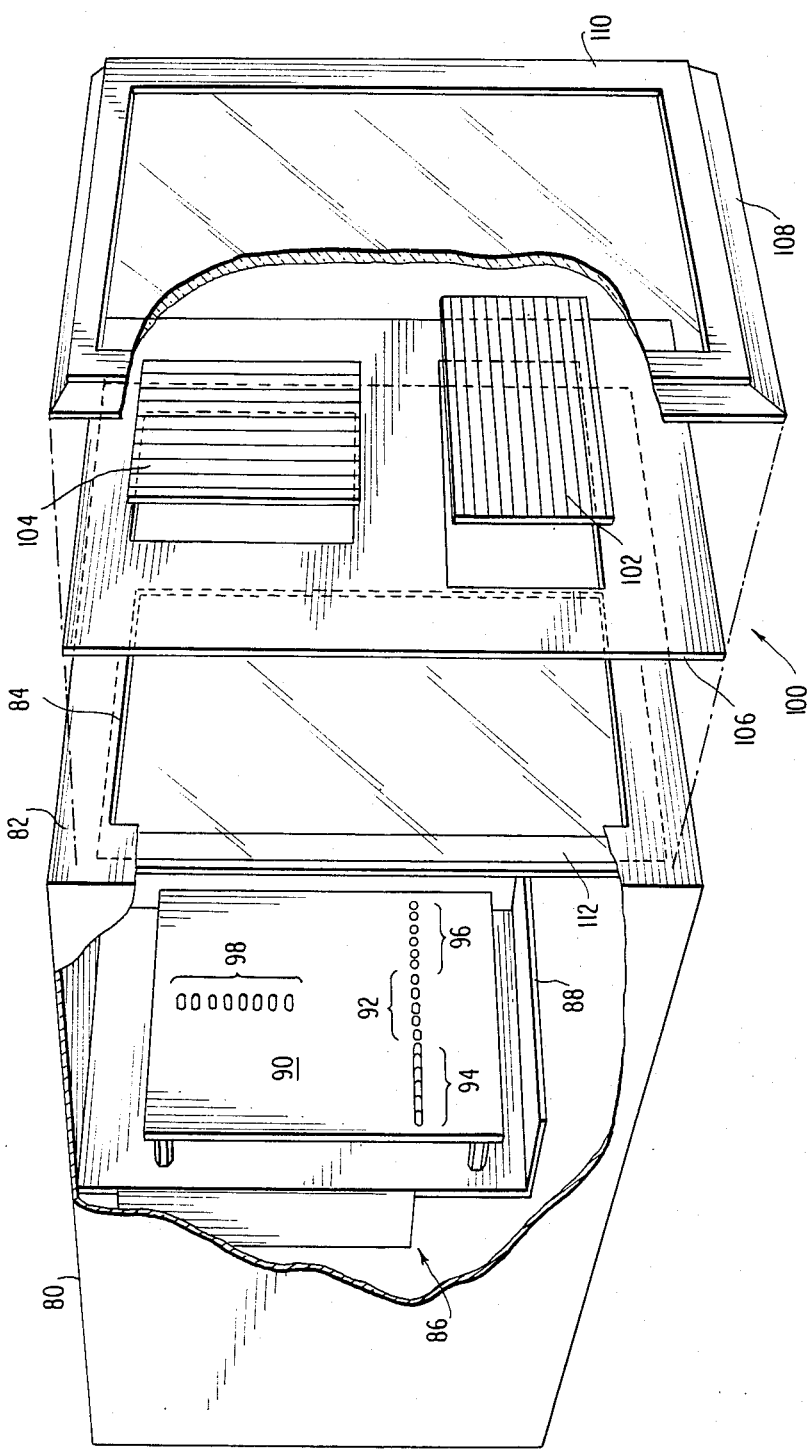
FIG. 8 is an exploded prespective view of a marker light according to the teachings of the invention with some parts broken away.

FIG. 8 depicts in detail a marker light assembly embodying the concepts of the present invention. An assembly such as that shown in FIG. 8 could be used as a separate unit packaged with other units, as for example end of train equipment, or it could be integrated into the equipment. The marker light of FIG. 8 includes the elements arranged in configurations generally shown in FIGS. 3 through 6. A box-like enclosure or housing 80 is provided having solid top, bottom and side walls, with the exeption of wall 82 which has a rectangular cutout portion or opening 84 to permit passage of light. A lamp assembly, or light source, generally indicated at 86, is positioned inside the enclosure 80 and comprises a mounting bracket 88 having a PC board 90 attached thereto. An array consisting of four rows of LEDs is carried on the PC board. These four rows include a central row 92, two rows 94 and 96 outboard of the central row, all extending in a horizontal line across the lower portion of PC board 90, and a single vertical row 98 extending along the upper part of the vertical centerline of the board. The LEDs in outboard rows 94 and 96 are tilted as before at an angle a toward the center of the array as described with respect to FIGS. 3 and 5. Mounting bracket 88 is attached in any well known manner to the housing as, for example, by bolting it to one or more walls of the housing.

The lens array and its mounting means are generally indicated by reference numeral 100. This assembly is mounted on the housing 80 over the opening 84 in side wall 82, through which the light beam emerges. As was previously discussed, the lenses required in this configuration are one horizontally extending cylidrical lens 102 and one vertically extending lens 104. Actually, for many applications, cylindrical lenses of the Fresnel type are suitable and, in fact, preferable. Cylindrical Fresnel lenses are lighter, cheaper and easier to mount than conventional cylindrical lenses, all of which are advantages in an railroad marker light. Lenses 102 and 104 are carried in a lens holder 106, of slightly larger dimensions than opening 84 so that the lens holder 106 can be placed over the opening and attached to wall 82. A lamp cover plate 108 of transparent material is provided to fit over the lens holder 106. Front bezel 110 and a rear backing frame 112, respectively, complete the assembly. Any satisfactory means, including screws, may be used to hold the lens assembly in place on housing 80, over the opening 84. If it is desired to use the light as a separate entitiy, it might be appropriate to include the control circuit of FIG. 16, described later, in the marker light housing 80.

Figure 9:
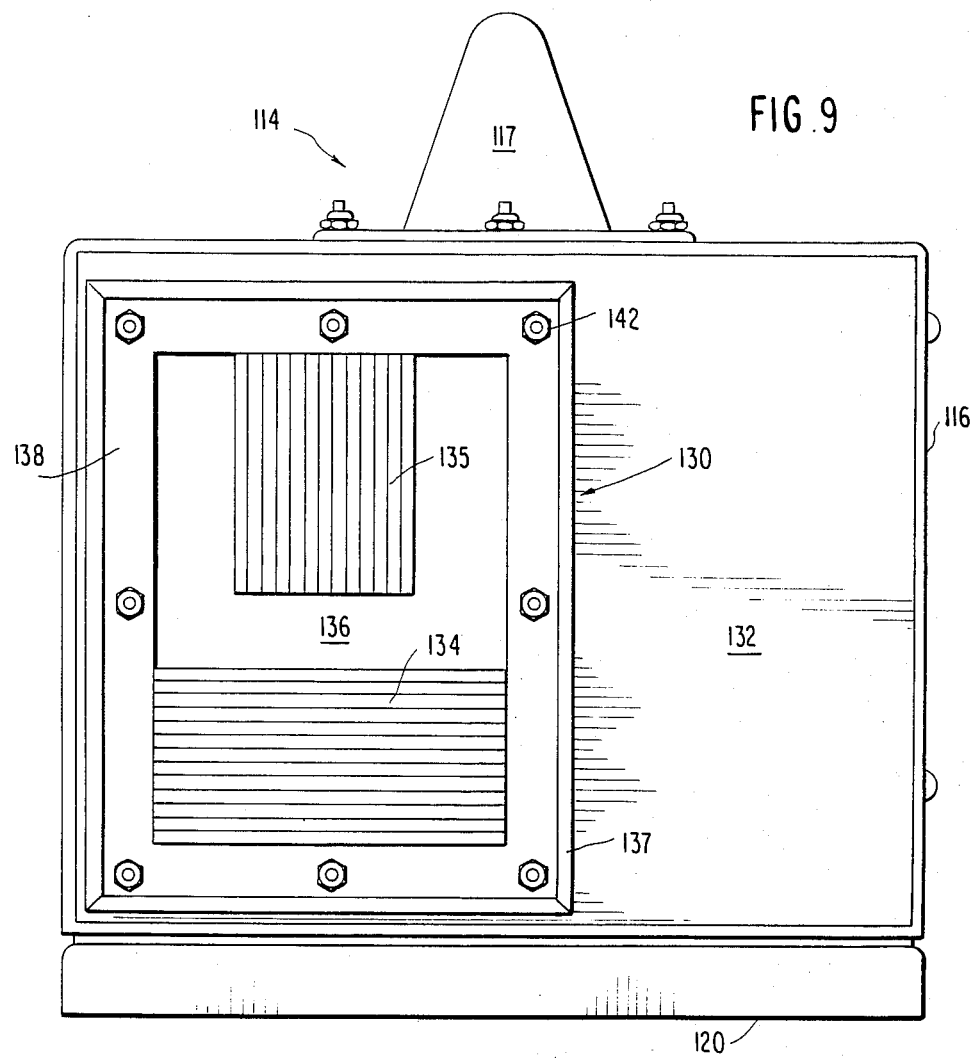
FIG. 9 is a rear elevational view of a railroad marker light in accordance with the present invention combined with a telemetry transmitter case.
Figure 10:
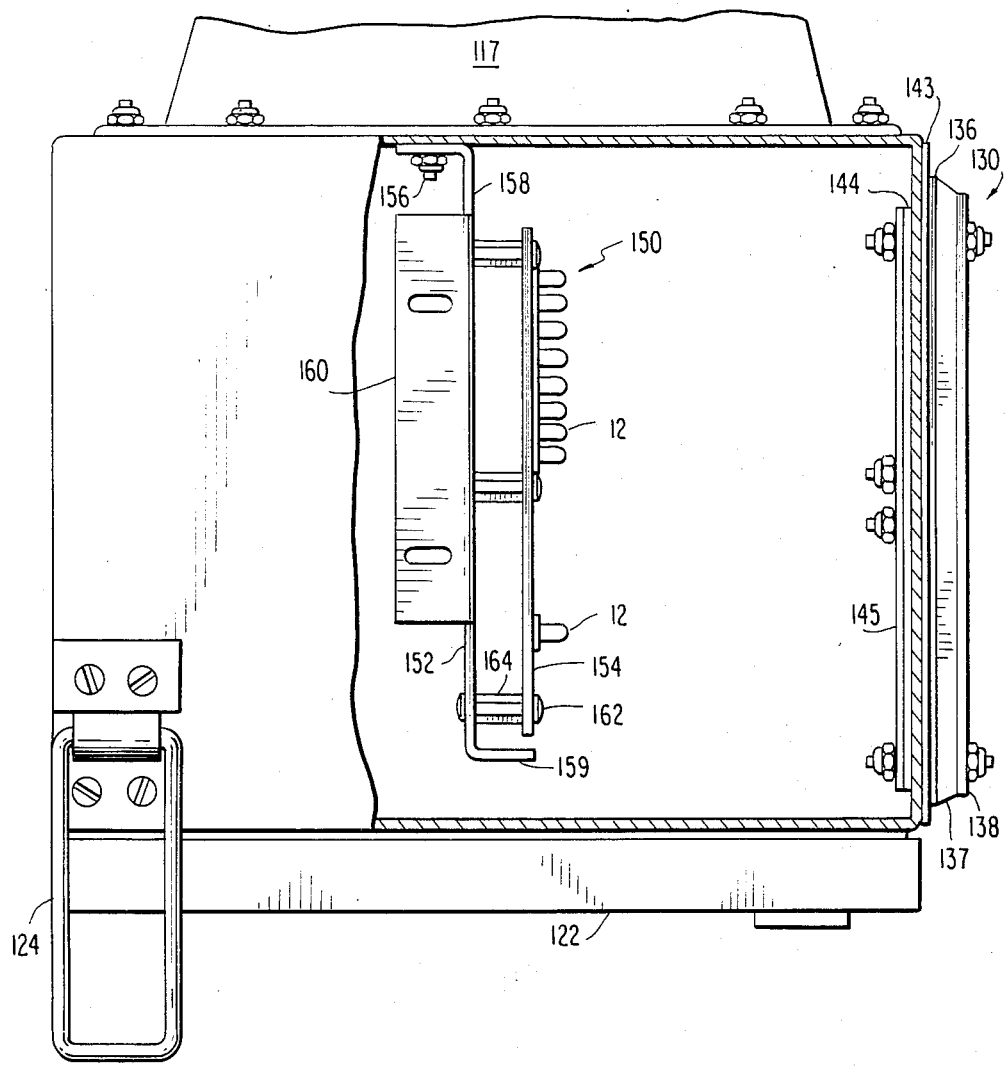
FIG. 10 is a side elevational view of the marker light of FIG. 9 with some parts broken away.

FIGS. 9 and 10 show the present invention incorporated with, i.e., integrated into, existing rear of train equipment. Referring particularly to FIG. 9, reference number 114 indicates generally a telemetry transmitter having a case 116. An antenna housing 117 is located on the top of transmitter 114 attached to the case 116. The transmitter case is provided with depending flanges 120 and 122 for fitting to other units of the end of train equipment, and a latch 124 for retaining the transmitter in place when it is mated to such other units. The lens assembly of the marker light, generally indicated by reference numeral 130, is shown attached to the case 116 of transmitter 114. Specifically, in FIG. 9, the lens assembly 130 is mounted on the rearwardly facing side 132 of the transmitter 114, i.e., the side from which the marker light is visible when in use on the rear of a train. An opening (not shown) is provided in side 132 of the transmitter case 116 to permit passage of light. First and second Fresnel lenses 134 and 135 are carried in a lens holder 136 which is held in place over the opening in the transmitter case by a transparent lamp cover 137 and front bezel 138. First Fresnel lens 134 is positioned in the lower part of the assembly and has its grain extending in the horizontal direction, while lens 135 is located above lens 134 and has its grain extending in the vertical direction. The lens assembly is fastened to housing 116 by an appropriate number of bolts 142 as seen in FIGS. 9 and 10. Gaskets 143, 144 and a rear metal frame 145 are used with the lens assembly to seal the opening in housing 116.

Figure 12:
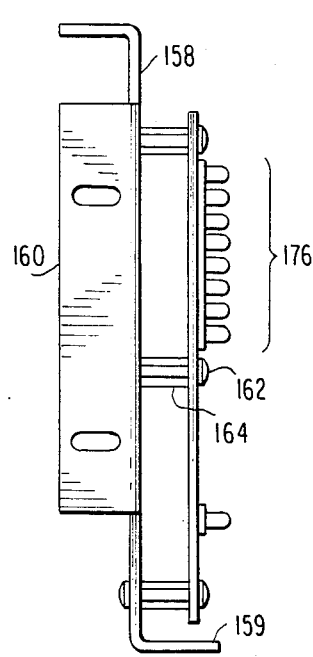
FIG. 12 is a view along line 12—12 of FIG. 11.
Figure 11:
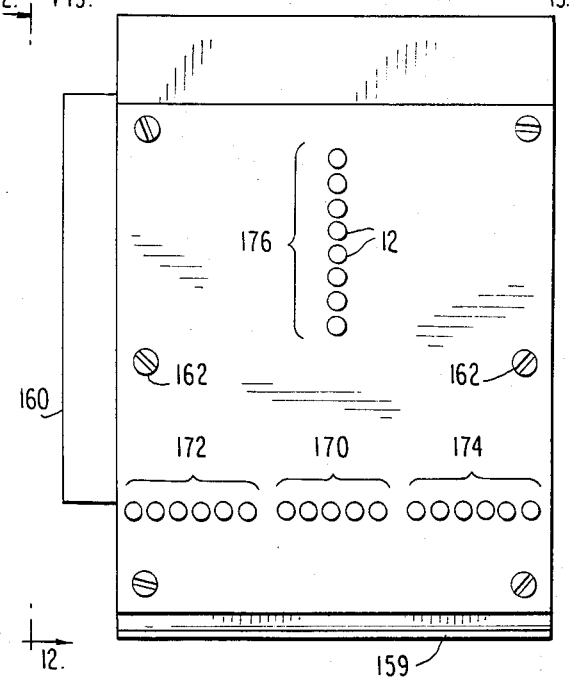
FIG. 11 is a plan view of the LED lamp module of the railroad marker light of FIG. 10.
Figure 13:
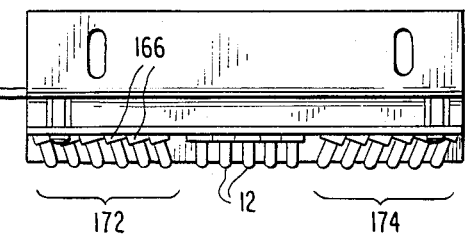
FIG. 13 is a view along line 13—13 of FIG. 11.

FIG. 10 shows an assembly 150 comprising bracket 152 and PC board 154 which carries the LEDs 12 mounted inside transmitter case or housing 116, behind lens assembly 130. The assembly 150 is shown in more detail in FIGS. 11, 12 and 13. Fabricated from sheet metal, bracket 152 is provided with right angle flanges 158, 159 and 160 along its top edge, bottom edge and one side, respectively, and is attached to the inside of the top of transmitter case 114 by bolts 156 passed through slotted openings in flange 158. PC board 154 is fastened in spaced relation to bracket 152 by screws 162 and spacing sleeves 164. An array comprising four rows 170, 172, 174, and 176 of LEDs 12 is carried on the PC board 154, the individual LEDs being mounted in sockets 166. A central row 170 of LEDs, and outboard rows 172 and 174 are arrayed in a horizontal line across the lower portion of the PC board. The fourth row 176 extends along the upper portion of the vertical centerline of PC board 154 at the center of the horizontal rows of LEDs. As was previously described, the array of LEDs is arranged in the proper relationship with the lens array to provide the required beam pattern in terms of shape and illumation.

Figure 14:
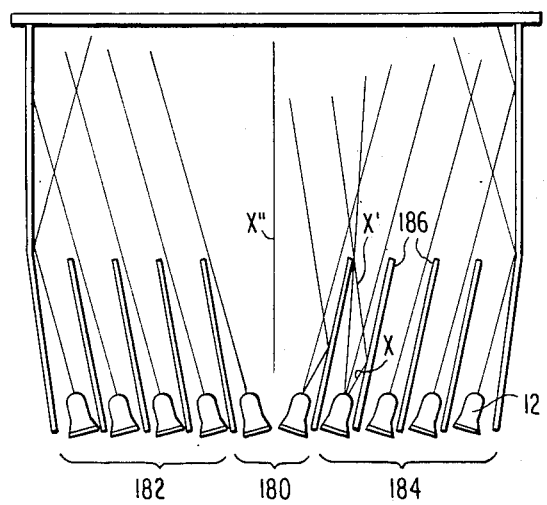
FIG. 14 is a schematic showing of a mirror arrangement for use with the LEDs to increase their efficiency.

FIG. 14 shows schematically an arrangement of mirrors which can be used in conjunction with a specific LED array and lens combination to improve light beam characteristics and thereby increase the overall efficiency of the marker light. Some of the light from an LED source, i.e. an array, falls outside the useful beam width as defined by the requirements for a marker light. Mirrors may be used to redirect, i.e., reflect, this light back into the useful beam. In FIG. 14, a horizontal line of LEDs 12 is shown schematically, including central row 180 and outboard rows 182 and 184 on either side of the central row, the outboard rows being tilted toward the center row as before at an angle a from the perpendicular to the plane of the LED array. Some of the rays emitted from the LEDs will fall outside the main beam; for example, the ray represented by the line x. Such rays as x can be intercepted by one or more mirrors 186 and reflected along path x' to mirror 188 where it is reflected a second time along path x" within the beam of useful light. Obviously, a second mirror would be placed on the other side of the main beam and others placed symmetrically with respect to the LED array may be required.

Figure 15:
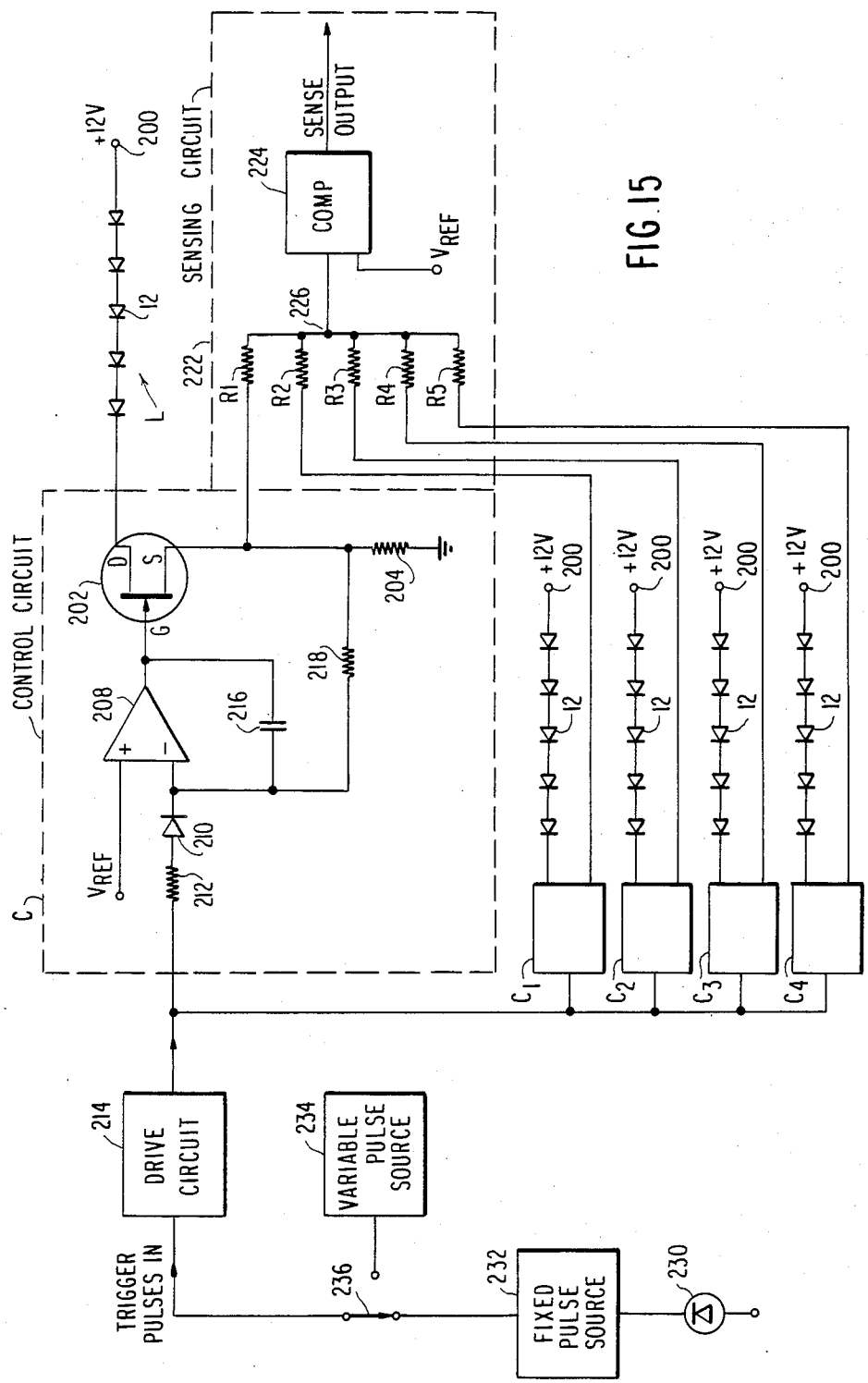
FIG. 15 is a schematic diagram of a control circuit for use with the marker light of this invention.

FIG. 15 shows a control circuit for use with the LED lamp which provides the required illumination for the marker light of this invention. For most applications of this invention, a relatively low voltage unregulated d.c. power supply such as a battery is all that is available. The battery is used as a common source of power not only for the LED lamp but for other equipment, such as, for example, the telemetry transmitter in the case of a railroad marker light. A relatively constant current, i.e., a current that is independent of the changes in battery voltage within a certain range is required to maintain the required level of illumination. Other considerations in such an environment are low power drain, low failure rate of LEDs, and a means for sensing a failure so that an indication of the failure can be provided.

In the example of FIG. 15, five strings of LEDs 12 are shown. Each string includes five LEDs connected in series. These LEDs comprise the lamp, i.e. light source, for a railroad marker light. One end of each of the strings of LEDs is connected to the positive terminal 200 of a source of voltage which in this case is a 12 volt battery. The other end of each string is connected to its associated one of control circuits C (shown inside the dotted outline), $C_1$, $C_2$, $C_3$, and $C_4$, each of which provides a constant current as well as a switching function for its respective string of LEDs. Only control circuit C used with the string of LEDs L, which is shown in detail, will be described since the remaining control circuits $C_1$, $C_2$, $C_3$, and $C_4$ are identical to control circuit C.

Referring to control circuit C, it is seen that the string of LEDs L is in fact connected at its other end to drain D of a low resistance power field effect transistor (FET) 202 which has its source S connected to the output of an operational amplifier 208 functioning as a voltage comparator. The inverting input terminal of operational amplifier 208 is connected through a blocking diode 210 and resistor 212 to a drive circuit 214 which provides pulses of appropriate magnitude and timing to operational amplifier 208 as well as to the other control circuits not shown in detail. An integrating capacitor 216 is connected between the output of operational amplifier 208 and its inverting input terminal. The other input to operational amplifier 208 is connected to a source of reference voltage. A resistor 218 is connected between metering resistor 204 and the inverting input of operational amplifier 208 providing negative feedback to regulate the current supplied to the LEDs 12 in string L to a predetermined level.

A voltage sensing circuit 222 is used to determine whether or not all of the diodes are functioning. To accomplish this, a comparator 224 has as one input the voltage appearing at the junction 226 of summing resistors $R_1$ through $R_5$ of equal value. The other terminals of the individual summing resistors are connected to respective ones of the metering and voltage sensing resistors in the control circuits C through $C_4$, only one of which resistors, i.e., 204, is shown. This arrangement provides a voltage at one input to comparator 224 representing the voltage across the respective strings of LEDs which in turn indicates the number of functioning LED strings. Comparator 224 has a reference voltage applied to its other input so that deviations from the reference voltage will provide an output signal in the event of an LED failure. The output signal can be transmitted to a remote location such as the cab of the locomotive to alert personnel to the failure. It is also possible to provide separate comparators for each control circuit so that the individual LED string which fails will be identified by the output from the corresponding comparator, but this is generally not required since an indication of failure of any one of the LED strings is sufficient to alert personnel that maintenance or replacement is necessary. A simplification of the sensing circuit can be achieved by replacing the comparator 224 with a logic gate such as an AND or a NOR gate, the voltages across the metering resistors being the logic levels for the inputs to these gates. Assuming positive logic, i.e. a positive voltage represents a binary one and ground a binary zero, then an AND gate will provide an output as long as all LED strings are functional and a NOR gate will provide an output when any one of the LED strings fails. Other variations are possible including the use of majority logic in the sensing circuit.

The pulses from the drive circuit 214 determine the duty cycle of the LEDs. Normally, the trigger pulses supplied to the drive circuit 214 have a repetition rate providing an output from the drive circuit 214 that switches the current to the LEDs on and off at the desired rate. The flashing rates prescribed for railroad marker lights in the publications referred to above fall into a range between not less than once every 1.3 seconds nor more than once every 0.7 second. This provides intermittent illumination, typical of caution lights, and warns that a train is ahead. Furthermore, to comply with requirements for displaying the light at night and all other times when visibility is below an established safe level, a photocell 230 is employed to turn the trigger pulse source on automatically.

In FIG. 15, photocell 230 controls the power to a fixed pulse source 232 which provides pulses to the drive circuit when the light is operating in the flasing mode described above. However, provision is also made for operating the light in a number of possible flashing rates by providing a variable pulse source 234 which is set to provide trigger pulses of several different repetition rates. An override switch 236 is actuated to disconnect source 232 and connect source 234 to the drive circuit. With this or a similar arrangement, different flashing rates could be used to indicate different situations, for example a stopped train, an accident ahead, a brake pressure failure and the like.

While the invention has been described in terms of specific preferred embodiments, those skilled in the art will recognize that modifications of the invention can be made without departing from the spirit and scope of the appended claims. For example, instead of linear arrays of LEDs and cylindrical lenses as described with respect to the preferred embodiments, it is possible to use planar arrays of LEDs and spherical lenses, either of the plano-convex type or the Fresnel type.

Having thus described our invention, what we claim and desire to secure by Letters Patent is set forth in the following claims:

1. A battery powered marker light for use with end of train equipment comprising:
   a light source including an array of light emitting diodes arranged to produce a light beam pattern in a red-orage-amber color range with a minimum arc width of at least 15 degrees on each side of a vertical center line and 5 degrees on each side of a horizontal center line and an intensity on an axis of the beam of not less than 100 candela; and
   an electonic circuit connected to said array of light emitting diodes for intermittantly turning said array of light emitting diodes on and off at a predetermined time interval to provide a flashing light.

2. The marker light recited in claim 1 further comprising a lens assembly positioned in front of said array of light emitting diodes for focussing the light therefrom in said light beam pattern.

3. The marker light recited in claim 1 wherein said array of light emitting diodes comprises at least two perpendicular linear arrays of light emitting diodes.

4. The marker light recited in claim 2 wherein said lens assembly comprises a cylindrical lens for each of said linear arrays.

5. The marker light recited in claim 4 wherein said cylindrical lenses for each of said linear arrays of light emitting diodes are Fresnel lenses.

6. The marker light recited in claim 1 wherein said circuit comprises:
   pulse drive means for providing electrical drive pulses;
   control means connected to said pulse drive means and responsive to said electrical drive pulses for turning said light emitting diodes on and off in synchronism with said electrical drive pulses; and
   sensing means connected to said control means for detecting a failure in said light emitting diodes and providing an indication of such failure.

7. The marker light recited in claim 6 wherein said sensing means comrpises comparator means for comparing an output of said control means with a reference.

8. The marker light recited in claim 6 wherein said array of light emitting diodes comprises light emitting diodes connected in a plurality of series strings, said control means including a plurality of control circuits, one for each of said series strings, and said sensing means is connected to each of said control circuits to sense voltages corresponding to the currents flowing through each of said series strings.

9. The marker light recited in claim 8 wherein said sensing means is a logic circuit which provides an output indicating at least one of said series strings has failed.

10. The marker light recited in claim 1 wherein the light source includes a printed circuit board mounting for the array of light emitting diodes and said array comprises linear arrays are aligned with horizontal and vertical axes.

11. The marker light recited in claim 10 wherein the linear array of light emitting diodes aligned with the horizontal axis is vertically displaced from the linear array of light emitting diodes aligned with the vertical axis, said linear array of light emitting diodes aligned with the horizontal axis comprising a central row of light emitting diodes and rows of light emitting diodes outboard of said central row on either side thereof, the centerline of the linear array of light emitting diodes aligned with the vertical axis bisecting the centerline of linear array of light emitting diodes aligned with the horizontal axis.

12. The marker light recited in claim 11 wherein the light emitting diodes of the outboard rows are mounted in tilted relation with respect to the light emitting diodes of the central row and toward the center of the linear array of light emitting diodes aligned with the horizontal axis.

13. The marker light recited in claim 1 wherein said array of light emitting diodes includes a central, vertically extending array of light emitting diodes, a first horizontally extending array of light emitting diodes positioned below said central, vertically extending array of light emitting diodes, the mid point of said first horizontally extending array of light emitting diodes being on the centerline of said central, vertically extending arrray of light emitting diodes, second and third horizontally extending arrays of light emitting diodes having their respective centerlines positioned in planes having a line of intersection parallel to the centerline of said central, vertically extending array of light emitting diodes, said second and third horizontally extending lines of light emitting diodes being positioned on each side of the central, vertically extending line of light emitting diodes.

14. The marker light recited in claim 4 wherein said lens means comprises first and second cylindrical Fresnel lenses further includes a rear bezel, a planar transparent lens cover and a front bezel, said Fresnel lenses being held in position by said rear bezel and said planar transparent lens cover and said lens assembly being secured to said housing by mounting means attached to said front bezel.

15. The marker light recited in claim 1 wherein said light source provides a pattern of light including a main beam, said marker light further including means for reflecting rays of light propagated off the axis of said main beam into said main beam.

16. The marker light recited in claim 1 wherein said circuit includes a pulse source of different repetition rates whereby said light emitting diodes can be energized at different flashing rates to provide visible signalling information.

* * * * *